(12) United States Patent
Park et al.

(10) Patent No.: US 11,329,524 B2
(45) Date of Patent: May 10, 2022

(54) ROTOR AND MOTOR HAVING SAME

(71) Applicant: LG INNOTEK CO., LTD., Seoul (KR)

(72) Inventors: Chang Hyun Park, Seoul (KR); Jae Young Kim, Seoul (KR); Il Sik Won, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 64 days.

(21) Appl. No.: 16/765,726

(22) PCT Filed: Nov. 21, 2018

(86) PCT No.: PCT/KR2018/014339
§ 371 (c)(1),
(2) Date: May 20, 2020

(87) PCT Pub. No.: WO2019/107828
PCT Pub. Date: Jun. 6, 2019

(65) Prior Publication Data
US 2020/0295609 A1 Sep. 17, 2020

(30) Foreign Application Priority Data

Nov. 30, 2017 (KR) .......................... 10-2017-0163239
Oct. 2, 2018 (KR) .......................... 10-2018-0117679

(51) Int. Cl.
*H02K 1/27* (2006.01)
*H02K 1/28* (2006.01)
*H02K 21/22* (2006.01)

(52) U.S. Cl.
CPC .................. *H02K 1/27* (2013.01); *H02K 1/28* (2013.01); *H02K 21/22* (2013.01)

(58) Field of Classification Search
CPC  H02K 1/27; H02K 1/28; H02K 21/22; H02K 1/278
See application file for complete search history.

(56) References Cited

U.S. PATENT DOCUMENTS

2010/0289367 A1  11/2010  Lau et al.
2011/0057523 A1  3/2011   Li et al.
(Continued)

FOREIGN PATENT DOCUMENTS

DE  11 2015 000 605 T5  11/2016
JP  60-125149 A         7/1985
(Continued)

OTHER PUBLICATIONS

Machine Translation, Hyun, KR-20160076729-A, Jul. 2016. (Year: 2016).*

*Primary Examiner* — Thomas Truong
(74) *Attorney, Agent, or Firm* — Birch, Stewart, Kolasch & Birch, LLP

(57) ABSTRACT

An embodiment relates to a motor comprising: a shaft; a rotor which is coupled to the shaft; and a stator which is disposed outside the rotor, wherein the rotor comprises a first can, a rotor core which is at least partially disposed in the first can, a plurality of magnets which are coupled to the rotor core, and a second can in which another portion of the rotor core is disposed, the plurality of magnets are spaced apart in the circumferential direction by a plurality of spacing spaces, the first can comprises a first plate portion, a first protrusion portion which is formed by bending at an edge of the first plate portion, and a plurality of first protrusions which are disposed on at least two of the plurality of spacing spaces and spaced apart from each other, the second can includes a second plate portion, a second protrusion portion which is formed by bending at the edge of the second plate portion, and a plurality of second protrusions which are disposed on at least two different spaces of the plurality of spacing spaces and spaced from each other, and the first protrusion and the second protrusion are arranged to be offset from each other.

20 Claims, 16 Drawing Sheets

(56) References Cited

U.S. PATENT DOCUMENTS

| | | | |
|---|---|---|---|
| 2013/0057102 A1 | 3/2013 | Yamada et al. | |
| 2013/0257211 A1* | 10/2013 | Haga | H02K 1/278 310/156.12 |
| 2019/0068014 A1* | 2/2019 | Takano | H02K 1/28 |

FOREIGN PATENT DOCUMENTS

| | | | | |
|---|---|---|---|---|
| JP | 11-299149 | A | | 10/1999 |
| JP | 2004-360499 | A | | 12/2004 |
| JP | 2005-287271 | A | | 10/2005 |
| JP | 2006-25509 | A | | 1/2006 |
| JP | 2013-118799 | A | | 6/2013 |
| KR | 10-2016-0076729 | A | | 7/2016 |
| KR | 20160076729 | A | * | 7/2016 |
| KR | 10-2017-0032022 | A | | 3/2017 |

\* cited by examiner

[FIG. 1]
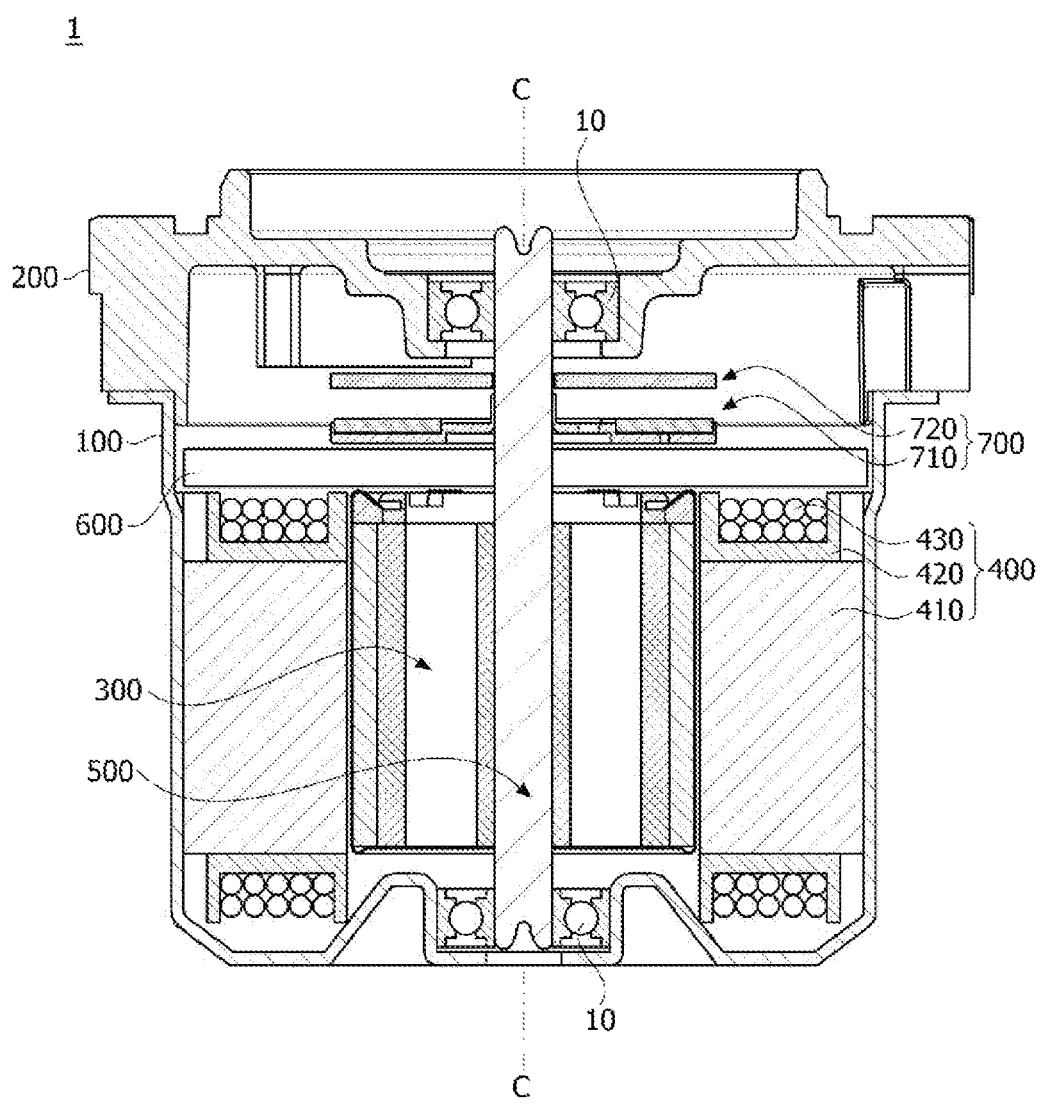

[FIG. 2]
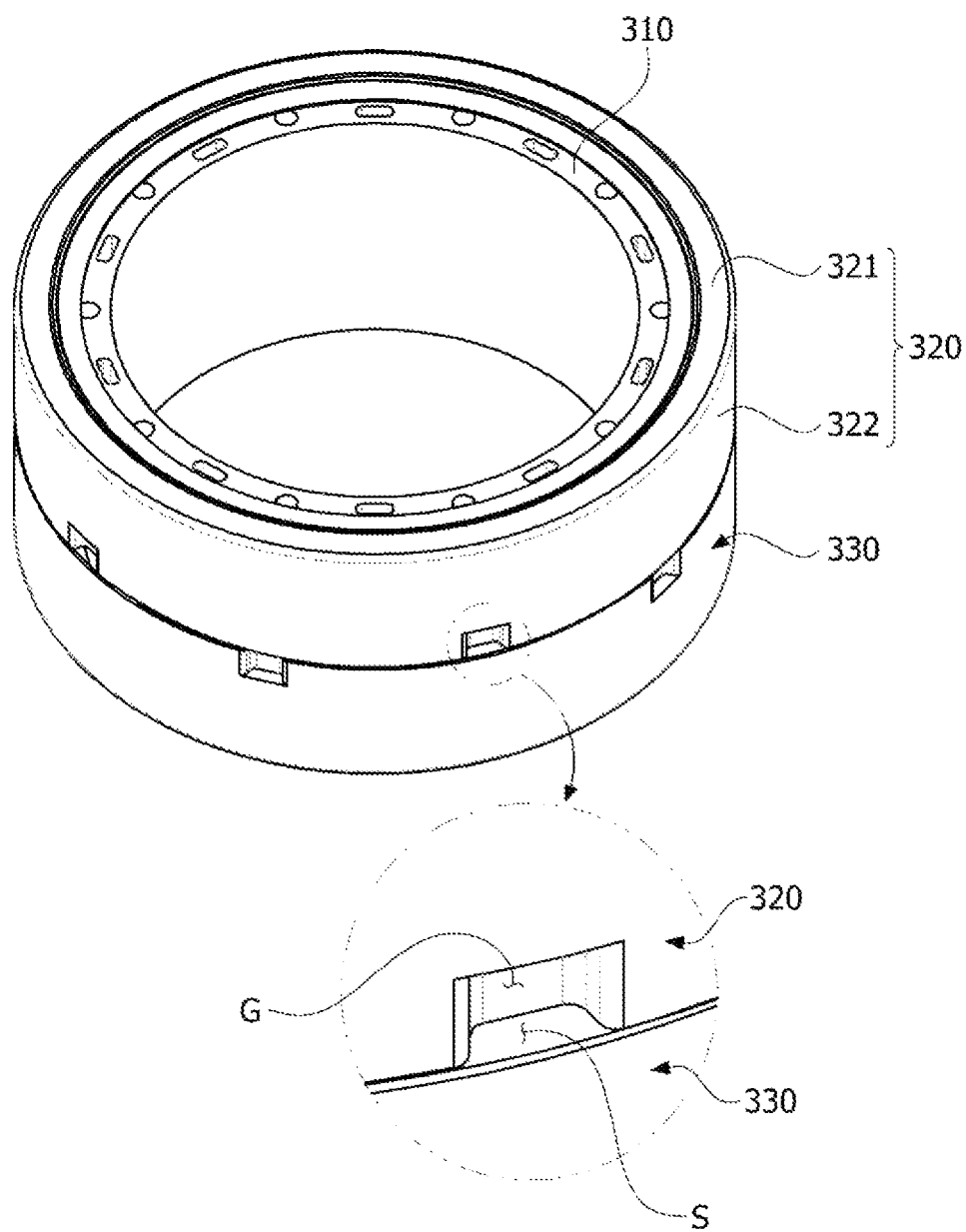

[FIG. 3]
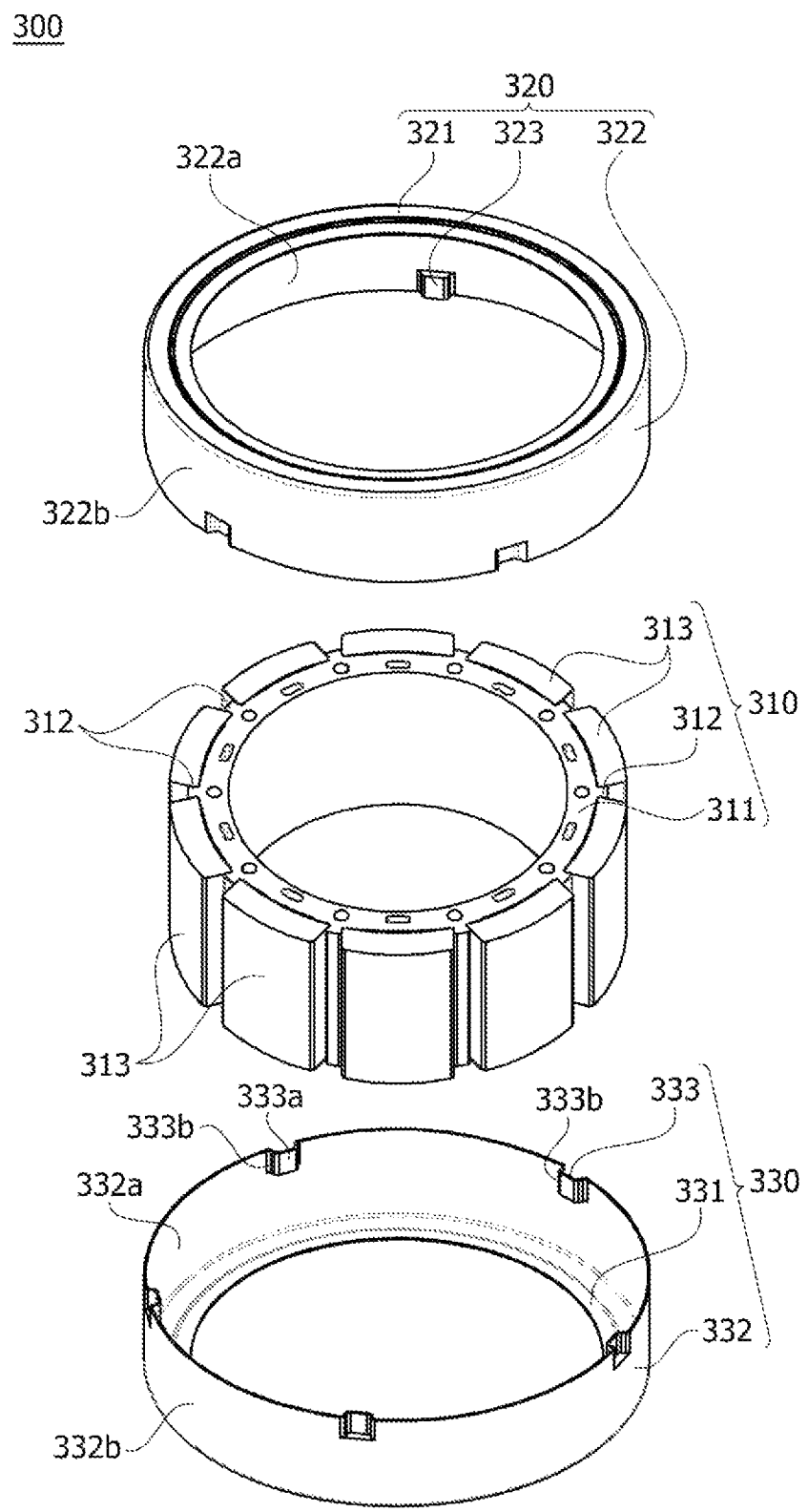

[FIG. 4]
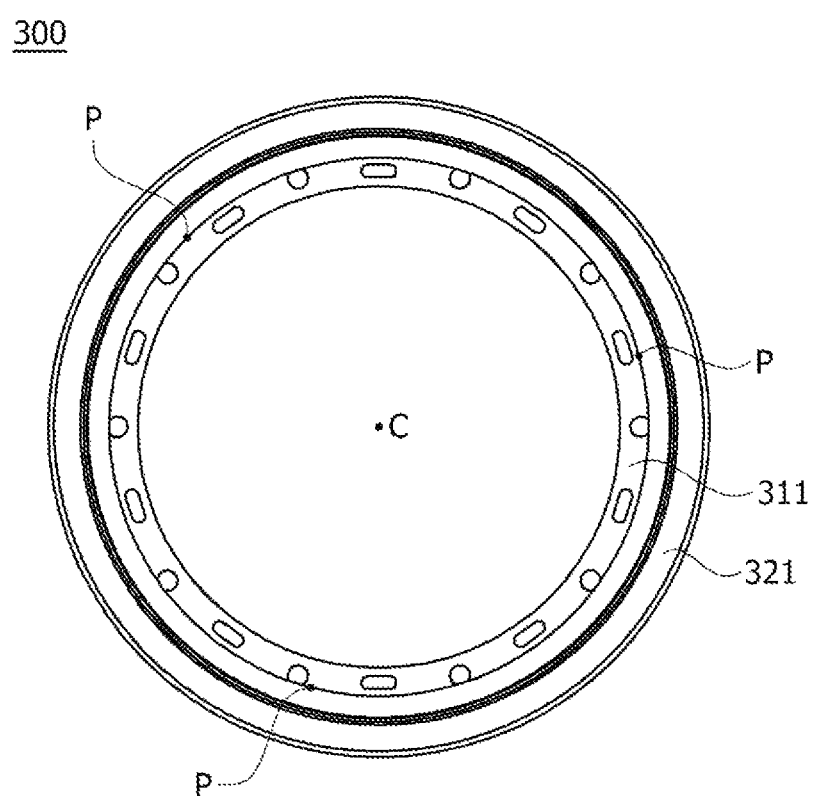

[FIG. 5]
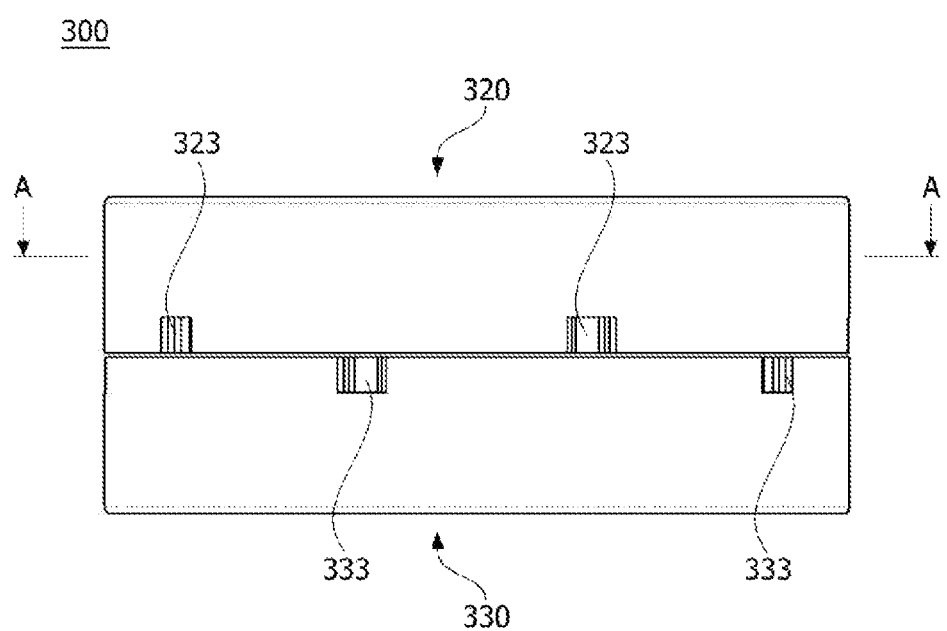

[FIG. 6]
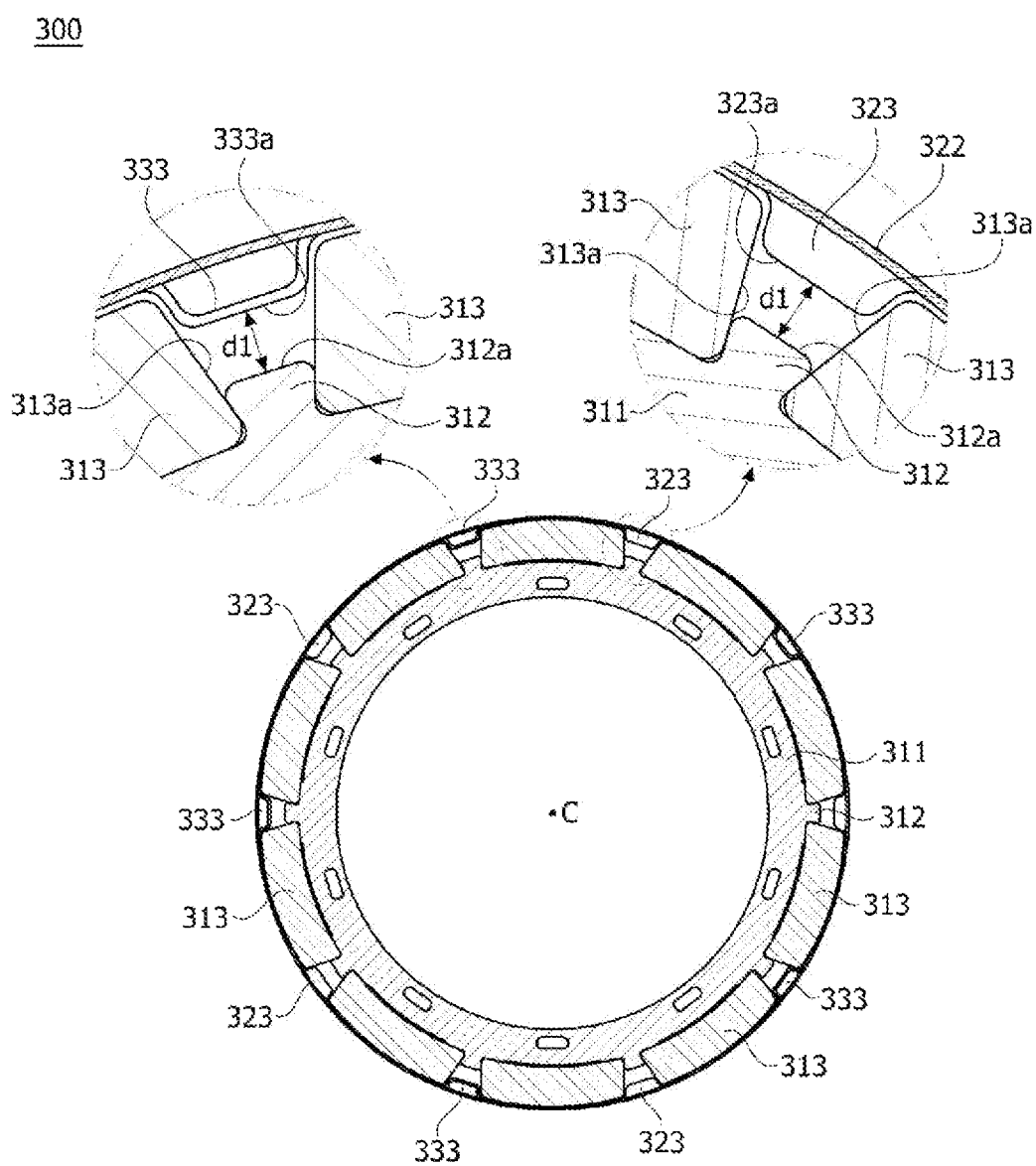

[FIG. 7]
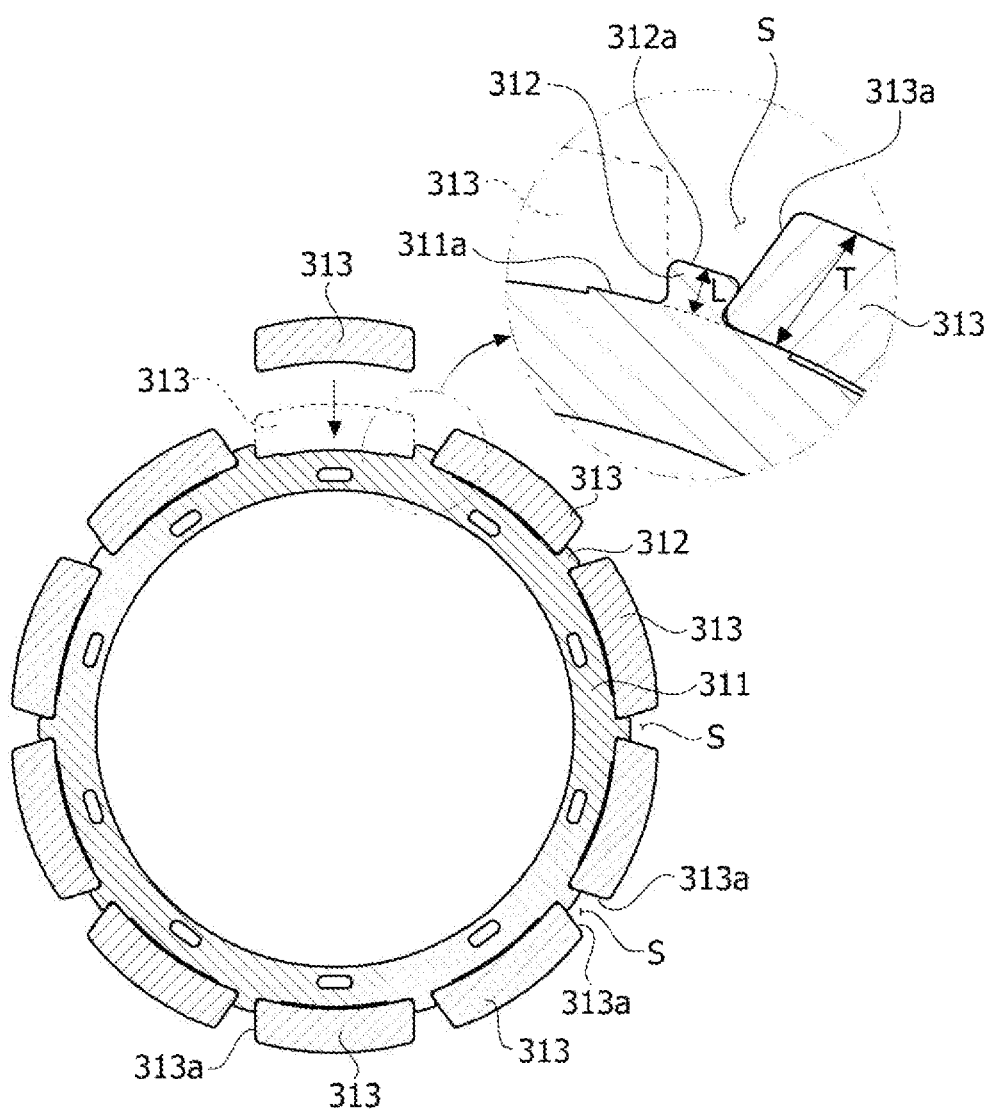

[FIG. 8]
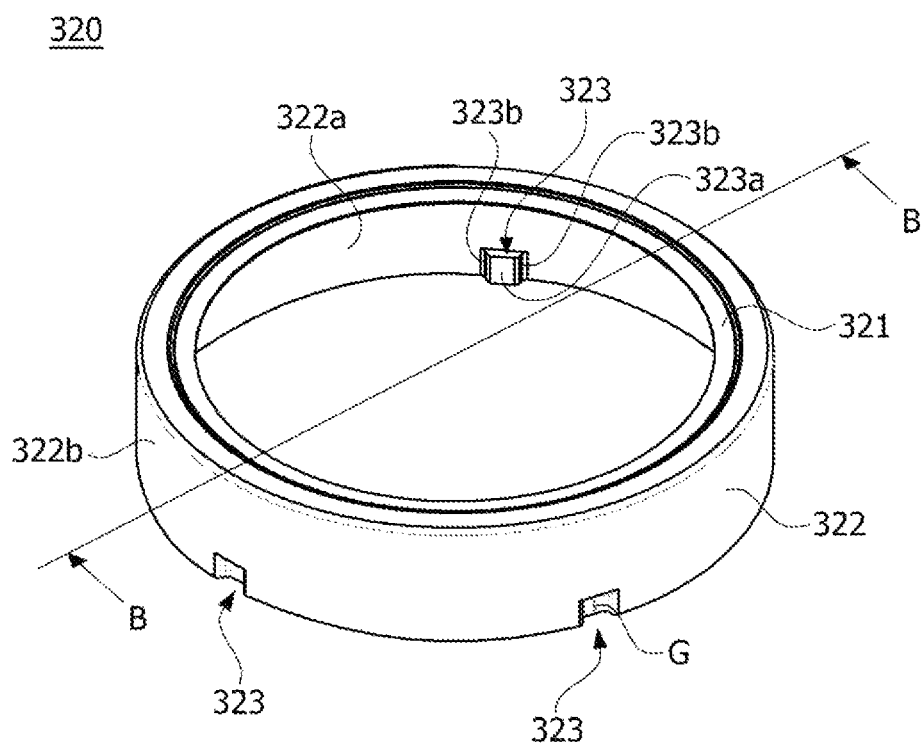
[FIG. 9]
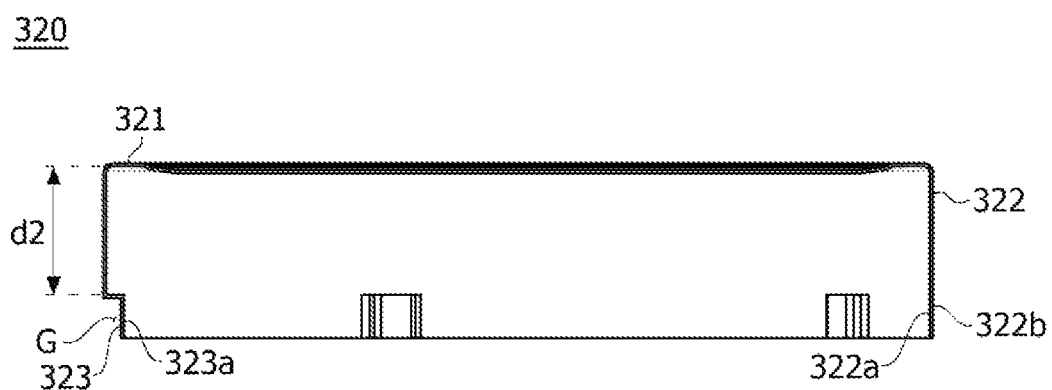

【FIG. 10】
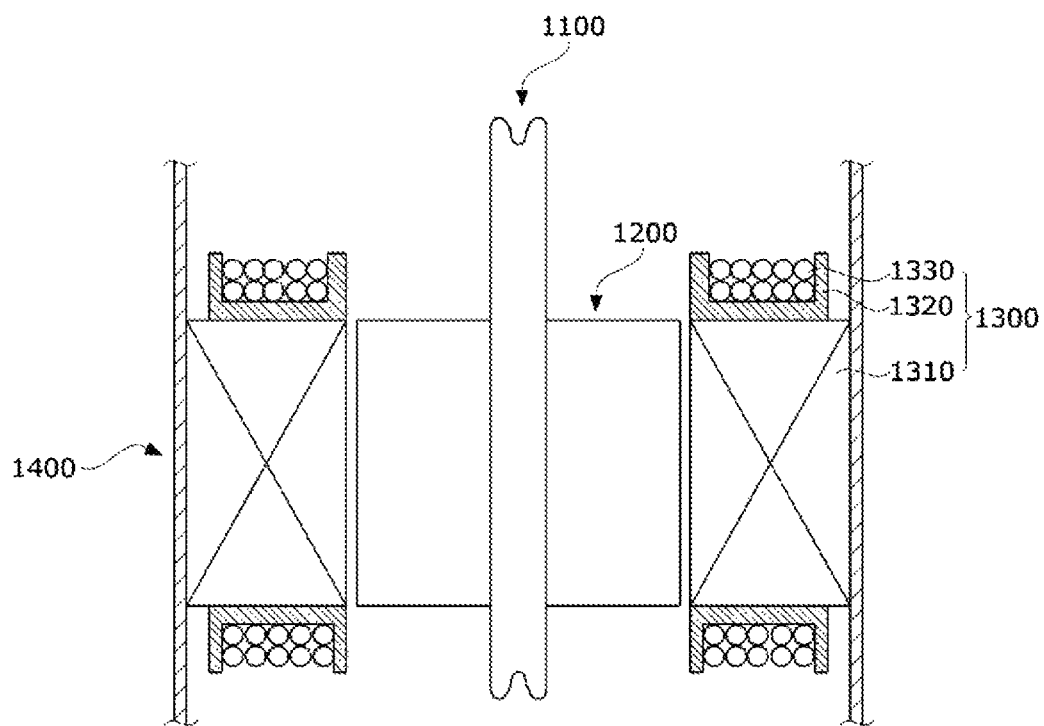

[FIG. 11]
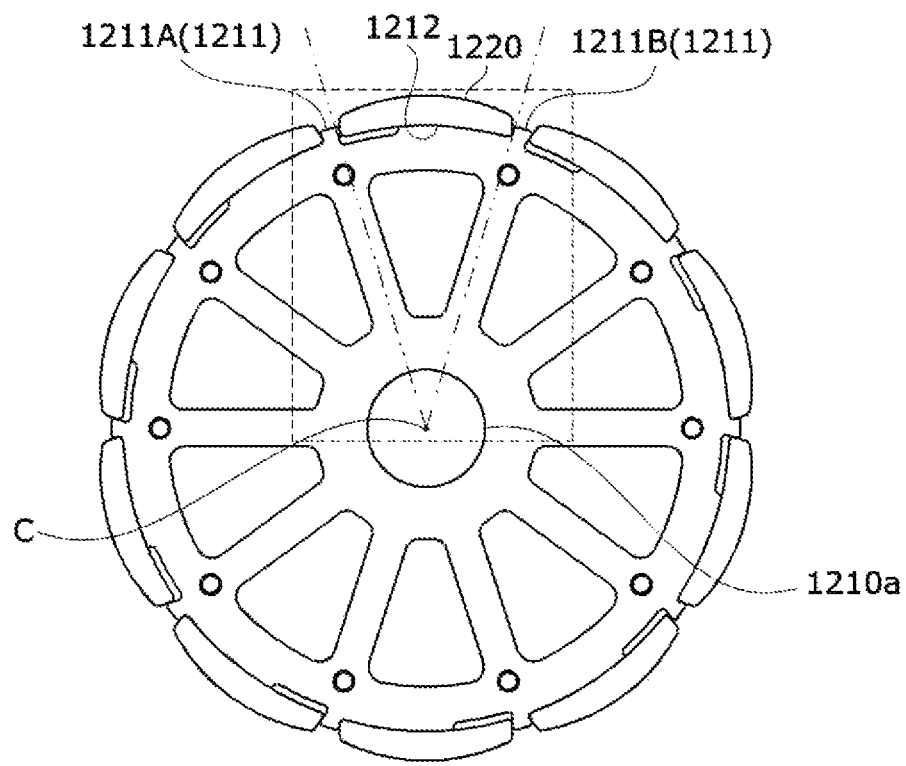

[FIG. 12]
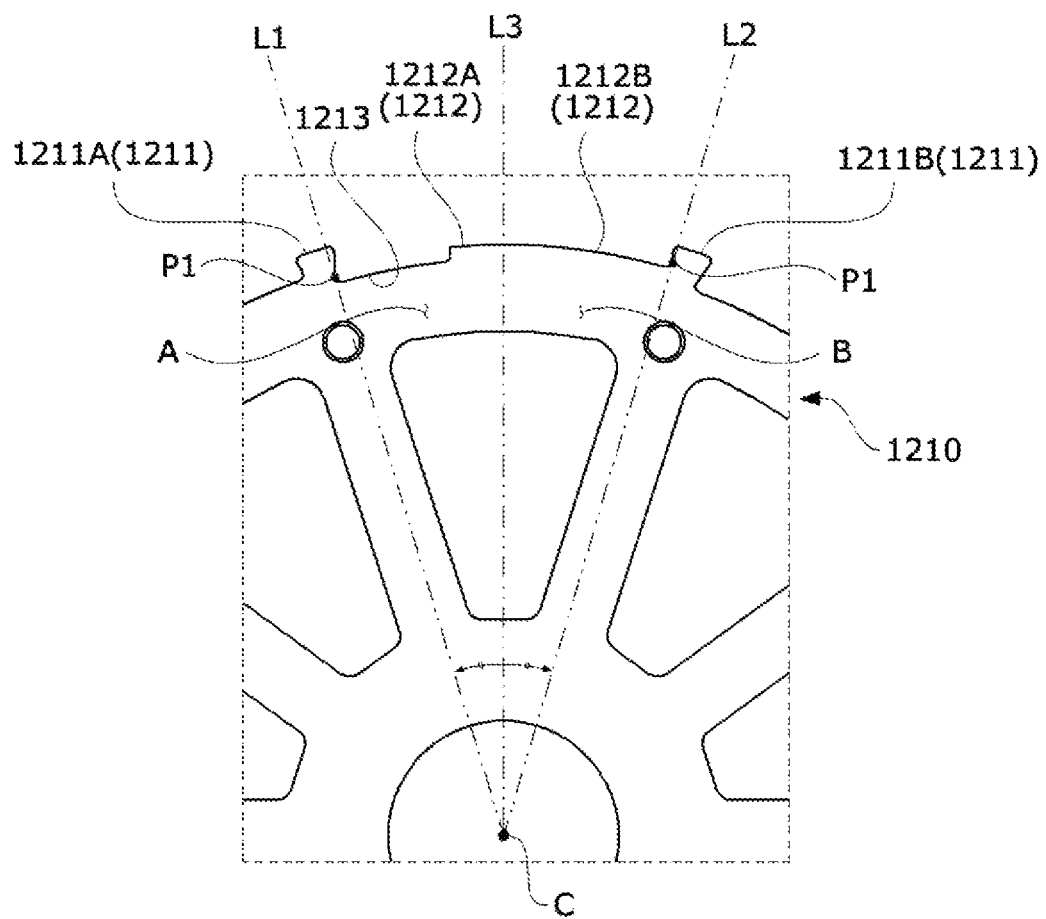

[FIG. 13]
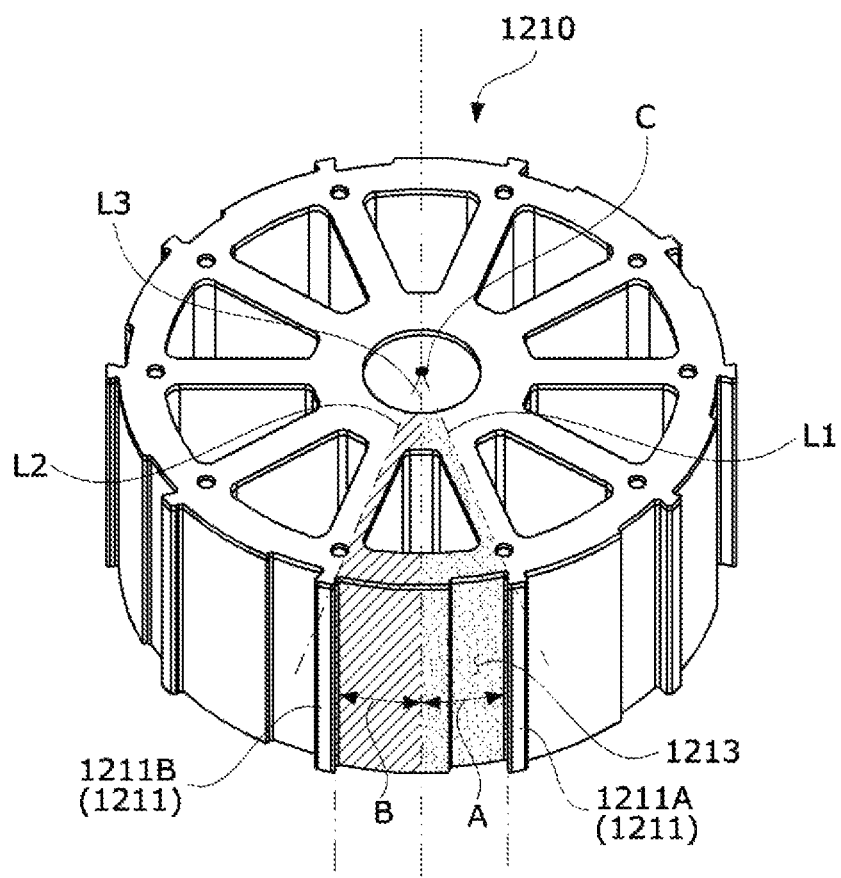

[FIG. 14]
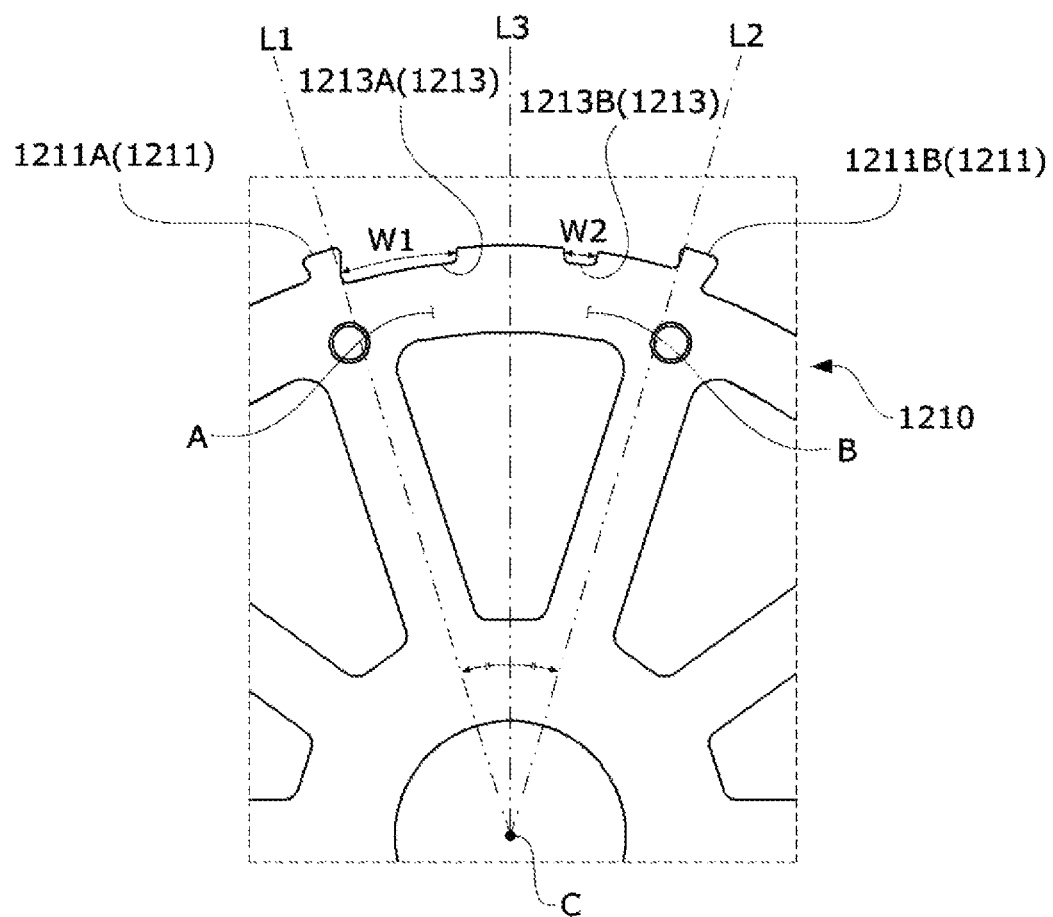

[FIG. 15]
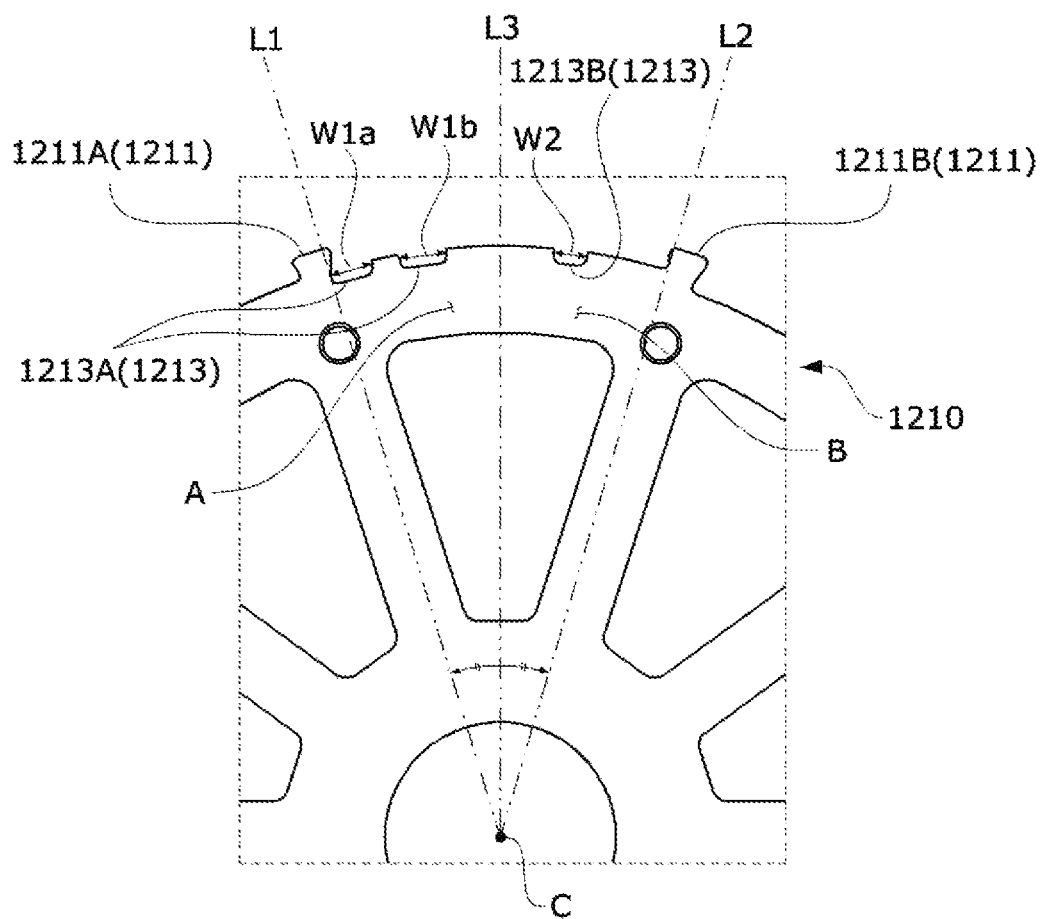

[FIG. 16]
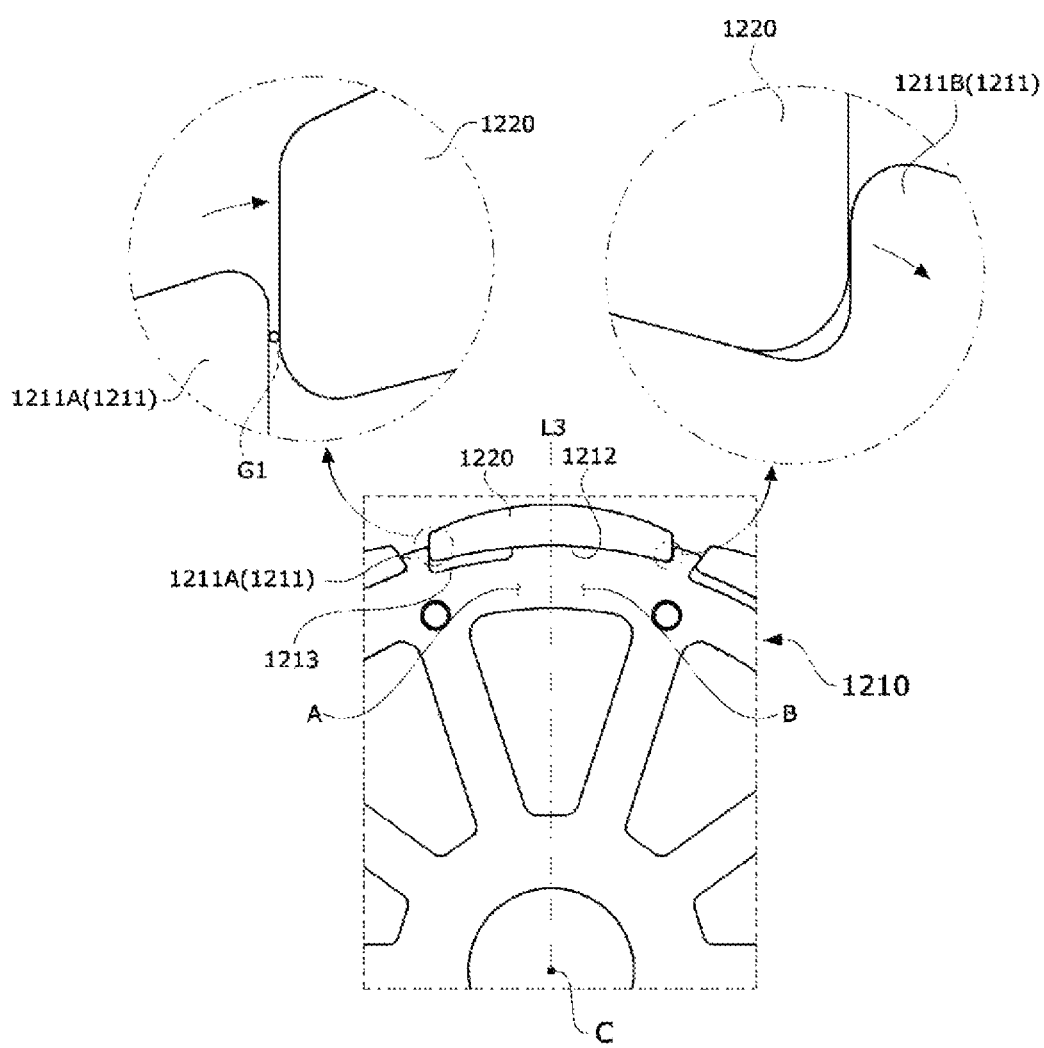

[FIG. 17]
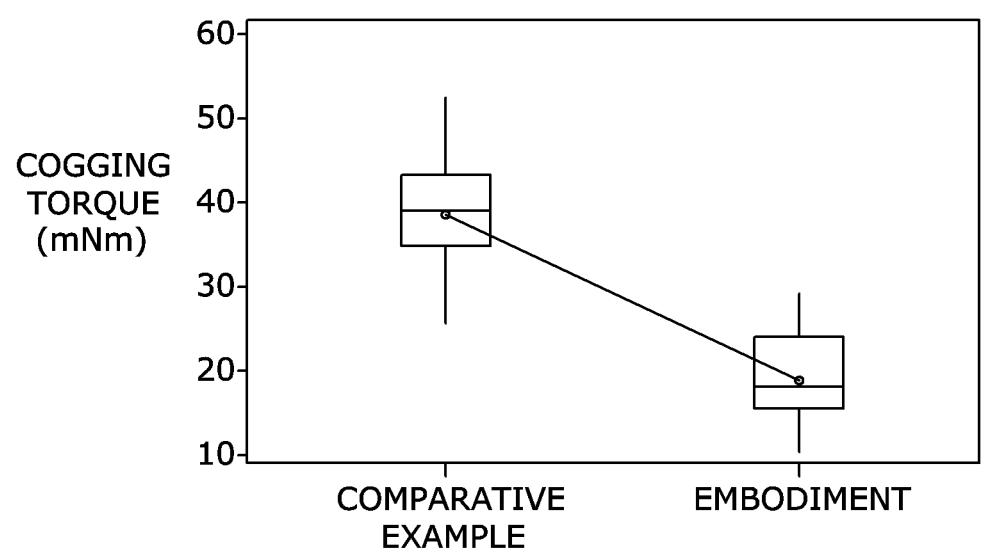

ROTOR AND MOTOR HAVING SAME

CROSS REFERENCE TO RELATED APPLICATIONS

This application is the National Phase of PCT International Application No. PCT/KR2018/014339, filed on Nov. 21, 2018, which claims priority under 35 U.S.C. 119(a) to Patent Application No. 10-2017-0163239, filed in the Republic of Korea on Nov. 30, 2017 and Patent Application No. 10-2018-0117679, filed in the Republic of Korea on Oct. 2, 2018, all of which are hereby expressly incorporated by reference into the present application.

TECHNICAL FIELD

Embodiments related to a rotor and a motor including the same.

BACKGROUND ART

Motors are devices which obtain torque by converting electrical energy into mechanical energy and are generally used in a vehicle, a home appliance, industrial equipment, and the like.

A motor may include a housing, a shaft, a stator disposed inside the housing, and a rotor installed on an outer circumferential surface of the shaft, and the like. Here, the stator of the motor causes an electrical interaction with the rotor and induces rotation of the rotor. Further, the shaft also rotates according to the rotation of the rotor.

Particularly, the motor may be used in a device for guaranteeing stability in steering of a vehicle. For example, the motor may be used in a motor for a vehicle such as an electronic power steering system (EPS) and the like.

A plurality of magnets are installed on the rotor. Here, depending on a method of installing the magnets, rotors are classified into an interior permanent magnet (IPM) type rotor in which magnets are inserted into and coupled to the rotor core and a surface permanent magnet (SPM) type rotor in which magnets are attached to a surface of a rotor core.

In the case of a motor including an SPM type rotor, since magnets are coupled to a rotor core only through bonding, when a bonding force becomes decreased, magnets are separated from the rotor core.

Meanwhile, magnets may be attached to an outer circumferential surface of the rotor core. Also, protrusions may be disposed on the outer circumferential surface of the rotor core. Here, a plurality of such protrusions may be arranged along the outer circumferential surface of the rotor core. Here, the plurality of magnets may each be disposed between the protrusions.

A position of each of the magnets has an effect on cogging torque of the motor. Due to a tolerance in a circumferential width of each of magnets and a tolerance in a distance between the protrusions, an error may occur in the position of each of magnets. When an error occurs in the position of each of magnets, the cogging torque increases.

DISCLOSURE

Technical Problem

Embodiments provide a rotor configured to protect magnets using a can and to prevent magnets attached to a rotor core from detaching using protrusions formed on the can at the same time and a motor including the rotor.

Embodiments are directed to providing a motor which reduces cogging torque.

Aspects of embodiments are not limited to the above-stated aspect and other unstated aspects thereof will be understood by those skilled in the art from a following description.

Technical Solution

One aspect of the present invention provides a motor including a shaft, a rotor coupled to the shaft, and a stator disposed outside the rotor. Here, the rotor includes a first can, a rotor core at least partially disposed in the first can, a plurality of magnets coupled to the rotor core, and a second can in which another part of the rotor core is disposed. The plurality of magnets are arranged to be spaced apart in a circumferential direction due to a plurality of separation spaces. The first can includes a first plate portion, a first protruding portion formed by bending an edge of the first plate portion, and a plurality of first protrusions disposed in at least two different separation spaces of the plurality of separation spaces and spaced apart. The second can includes a second plate portion, a second protruding portion formed by bending an edge of the second plate portion, and a plurality of second protrusions disposed in at least two different separation spaces of the plurality of separation spaces and spaced apart. The first protrusions and the second protrusions are arranged to be diagonal to one another.

The first protrusions and the second protrusions may be arranged at different heights on the basis of bottom surfaces of the magnets.

The first protrusions may be formed on an end of the first protruding portion, and the second protrusions may be formed on an end of the second protruding portion.

The end of the first protruding portion may come into contact with the end of the second protruding portion.

The first protrusions may be formed to protrude from an inner circumferential surface of the first protruding portion, and grooves may be formed on an outer circumferential surface of the first protruding portion at positions corresponding to the first protrusions.

Distances between the first protrusions and the second protrusions may be uniform.

The separation space may be formed to extend from a top surface to a bottom surface of the rotor core, and the first protrusion and the second protrusion may be arranged in a region more adjacent to a center than both ends of the separation space.

The rotor core may include a plurality of accommodation portions which accommodate the plurality of magnets, and at least one of the plurality of accommodation portions may include a surface in which a groove is formed. Here, the rotor core may include a plurality of guides formed to extend outward from an outer circumferential surface thereof. Each of the plurality of guides may be disposed in each of the plurality of separation spaces, and the accommodation portion may be defined as a region between the plurality of guides. The groove of the accommodation portion may be formed to extend from a top surface of the rotor core to a bottom surface of the rotor core and be disposed to be adjacent to the guide.

Another aspect of the present invention provides a rotor including a rotor portion including a rotor core and a plurality of magnets arranged to be spaced apart on an outer circumferential surface of the rotor core, a first can configured to cover an upper part of the rotor portion, and a second can configured to cover a lower part of the rotor portion.

Here, the first can includes first protrusions arranged in separation spaces each formed between the magnets, and the second can includes second protrusions arranged in the separation spaces each formed between the magnets.

Here, the first protrusions and the second protrusions may be alternately arranged along a circumferential direction of the rotor core.

One side of the magnet may come into contact with the first protrusion, and the other side of the magnet may come into contact with the second protrusion.

The first can may include a ring-shaped first plate portion disposed above the rotor portion and a first protruding portion protruding from an outer circumferential surface of the first plate portion in an axial direction. The second can may include a ring-shaped second plate portion disposed below the rotor portion and a second protruding portion protruding from an outer circumferential surface of the second plate portion in the axial direction. The first protrusions may be formed on the first protruding portion, and the second protrusions may be formed on the second protruding portion.

The first protrusions formed on the first protruding portion may be arranged to be spaced at a certain distance from the first plate portion, and the second protrusions formed on the second protruding portion may be arranged to be spaced at a certain distance from the first plate portion.

The first protrusion may be formed by pressurizing one region of an outer circumferential surface of the first protruding portion, and the second protrusion may be formed by pressurizing one region of an outer circumferential surface of the second protruding portion.

The first can may include a first groove formed by pressurizing one region of the outer circumferential surface of the first protruding portion, and a lower side of the first groove may communicate with the separation space.

The second can may include a second groove formed by pressurizing one region of the outer circumferential surface of the second protruding portion, and an upper side of the second groove may communicate with the separation space.

As the first protrusion and the second protrusion are formed, a side surface of each of the first protrusion and the second protrusion may be pressed against a side surface of the magnet.

The first plate portion of the first can and the second plate portion of the second can may be fixed to the rotor core through welding.

The rotor core of the rotor portion may further include guides protruding outward from an outer circumferential surface thereof, and the magnet may be disposed between the guides.

An inner surface of each of the first protrusion and the second protrusion may be disposed to be spaced apart from an outer surface of the guide.

The first protrusions and the second protrusions may be formed to be rotationally symmetrical to each other on the basis of a center of the rotor core.

Still another aspect of the present invention provides a motor including a shaft, a rotor on which the shaft is disposed at a center, and a stator disposed outside the rotor. The rotor includes a rotor portion including a rotor core and a plurality of magnets arranged to be spaced apart on an outer circumferential surface of the rotor core, a first can configured to cover an upper part of the rotor portion, and a second can configured to cover a lower part of the rotor portion. Here, the first can includes first protrusions arranged in separation spaces each formed between the magnets, and the second can includes second protrusions arranged in the separation spaces each formed between the magnets.

Here, the first protrusions and the second protrusions may be alternately arranged along a circumferential direction of the rotor core.

One side of the magnet may come into contact with the first protrusion, and the other side of the magnet may come into contact with the second protrusion.

Yet another embodiment of the present invention provides a motor including a stator, a rotor disposed inside the stator and including a rotor core and magnets disposed on an outer circumferential surface of the rotor core, and a shaft coupled to the rotor. Here, the rotor core includes a cylindrical body and a plurality of guides protruding from an outer circumferential surface of the body in a radial direction. The body includes a surface disposed between the guides and on which the magnets are arranged and grooves formed to be recessed from the surface toward a center of the rotor. The guides include a first guide and a second guide disposed to be adjacent to the first guide. The grooves are asymmetrically arranged on the surface on the basis of a virtual line which connects a center of the body to a circumferential center between the first guide and the second guide.

The grooves may be consecutively arranged from a top surface to a bottom surface of the rotor core in an axial direction.

The grooves may be arranged on one side on the basis of the virtual line. The surface may include a first surface with the grooves and a second surface without the grooves. The magnet may be disposed to be spaced apart from the first guide and come into contact with the second guide.

The grooves may include a first groove and a second groove. The surfaces may include a first surface in which the first groove is disposed and a second surface in which the second groove is disposed on the basis of the virtual line. The first guide may be disposed to be adjacent to the first surface, and the second guide may be disposed to be adjacent to the second surface. A size of the first groove may be greater than a size of the second groove. The magnet may be disposed to be spaced apart from the first guide and come into contact with the second guide.

A plurality of such first grooves and a plurality of such second grooves may be formed. A sum of the sizes of the plurality of first grooves may be greater than a sum of the sizes of the plurality of second grooves.

A further embodiment of the present invention provides a motor including a stator, a rotor disposed inside the stator and including a rotor core and magnets arranged on an outer circumferential surface of the rotor core, and a shaft coupled to the rotor. The rotor core includes a cylindrical body and a plurality of guides protruding from an outer circumferential surface of the body in a radial direction. The guides include a first guide and a second guide disposed to be adjacent to the first guide. The body includes a first part and a second part distinguished on the basis of a virtual line which connects a center of the body to a circumferential center between the first guide and the second guide. A volume of the first part and a volume of the second part differ from each other.

The first guide may be disposed to be adjacent to the first part, and the second guide may be disposed to be adjacent to the second part. The volume of the second part may be greater than the volume of the first part. The magnet may be disposed to be spaced apart from the first guide and come into contact with the second guide.

The first part may include a groove formed to be recessed from an outer circumferential surface of the first part, and the second part may not include a groove formed to be recessed from an outer circumferential surface of the second part.

A first groove may be disposed in the outer circumferential surface of the first part, a second groove may be disposed in the outer circumferential surface of the second part, and a size of the first groove may be greater than a size of the second groove.

A sum of sizes of a plurality of such first grooves may be greater than a sum of sizes of a plurality of such second grooves.

Advantageous Effects

A rotor according to embodiments which includes the above components and a motor including the rotor can prevent magnets from being separated by disposing a protrusion formed on a can between the magnets.

Also, the number of such protrusions can be minimized by forming the protrusion on a first can disposed above a rotor portion and a second can disposed therebelow and alternately arranging the protrusions formed on the first can and the second can along a circumferential direction.

Since the protrusions can be formed by pressurizing one regions of the first can and the second can while the first can and the second can are disposed on the rotor portion, minimization of the number of the protrusions may minimize a load applied to the magnets. Accordingly, damages to the magnets can be minimized.

Also, since the protrusions may be formed by pressurizing one regions of the first can and the second can, the rotor and the motor including the rotor may be pressed against the magnets to a degree and have a vibration-suppressing property.

Also, the first can and the second can are implemented to have the same shape so as to reduce manufacturing costs of the cans.

According to the embodiments, an effect of a motor configured to reduce cogging torque by stably mounting magnets in precise positions is provided.

A variety of advantageous effects of the embodiments are not limited thereto and will be easily understood throughout the detailed description of the embodiments.

DESCRIPTION OF DRAWINGS

FIG. 1 is a view illustrating a motor according to embodiments;

FIG. 2 is a perspective view illustrating a rotor of the motor according to embodiments;

FIG. 3 is an exploded perspective view illustrating the rotor of the motor according to embodiments;

FIG. 4 is a plan view illustrating the rotor of the motor according to embodiments;

FIG. 5 is a side view illustrating the rotor of the motor according to embodiments;

FIG. 6 is a cross-sectional view illustrating the rotor of the motor according to embodiments;

FIG. 7 is a plan view illustrating a rotor portion disposed in the rotor of the motor according to embodiments;

FIG. 8 is a perspective view illustrating a first can disposed in the rotor of the motor according to embodiments;

FIG. 9 is a cross-sectional view illustrating the first can disposed in the rotor of the motor according to embodiments;

FIG. 10 is a view illustrating a motor according to embodiments;

FIG. 11 is a plan view illustrating a rotor;

FIG. 12 is a partially enlarged view of the rotor;

FIG. 13 is a view illustrating a first part and a second part of a rotor core;

FIG. 14 is a view illustrating a modified example of the rotor core;

FIG. 15 is a view illustrating another modified example of the rotor core;

FIG. 16 is a view illustrating movement of magnets caused by asymmetry in magnetic force; and FIG. 17 is a view illustrating cogging torques in a comparative example and an embodiment.

MODES OF THE INVENTION

Hereinafter, exemplary embodiments of the present invention will be described in detail with reference to the drawings.

However, the technical concept of the present invention is not limited to some embodiments disclosed below but can be implemented in a variety of different forms. One or more of components of the embodiments may be selectively combined or substituted with one another without departing from the scope of the technical concept of the present invention.

Also, unless defined otherwise, the terms (including technical and scientific terms) used herein may be used as meanings capable of being commonly understood by one of ordinary skill in the art. Also, terms defined in generally used dictionaries may be construed in consideration of the contextual meanings of the related art.

Also, the terms used herein are intended to describe the embodiments but not intended to restrict the present invention.

Throughout the specification, unless particularly stated otherwise, singular forms include plural forms. When the present invention is stated to include at least one (or one or more) of A, B, and C, one or more of all combinations of A, B, and C may be included.

Also, in describing components of the embodiments of the present invention, the terms such as first, second, A, B, (a), (b), and the like may be used.

These terms are merely for distinguishing one element from another, and the essential, order, sequence, and the like of corresponding elements are not limited by the terms.

Also, when it is stated that one element is "connected," or "coupled" to another, the element may not only be directly connected or coupled to the other element but may also be connected or coupled to the other element with another intervening element.

Also, when it is stated that an element is formed or disposed "above (on) or below (under)" another element, not only may the two elements come into direct contact with each other but also still another element may be formed or disposed between the two elements. Also, being "above (on) or below (under)" may include not only being in an upward direction but also being in a downward direction on the basis of one element.

Hereinafter, the embodiments will be described below in detail with reference to that attached drawings. However, equal or corresponding components will be referred to as the same reference numerals regardless of drawing signs, and a repetitive description thereof will be omitted.

FIG. 1 is a view illustrating a motor according to embodiments.

Referring to FIG. 1, a motor 1 according to embodiments may include a housing 100 with an opening formed in one side, a cover 200 disposed above the housing 100, a stator 400 disposed inside the housing 100, a rotor 300 disposed inside the stator 400, a shaft 500 configured to rotate with the rotor 300, a busbar 600 disposed above the stator 400, and a sensor portion 700 configured to sense rotation of the rotor 300. Here, the motor 1 according to embodiments may be a motor according to a first embodiment.

The motor 1 may be a motor used in an electronic power steering system (EPS). The EPS allows a driver to perform safe driving by securing turning stability and providing a quick restoring force by aiding in a steering force using a driving force of a motor.

The housing 100 and the cover 200 may form an exterior of the motor 1. Also, an accommodation space may be formed by coupling between the housing 100 and the cover 200. Accordingly, in the accommodation space, as shown in FIG. 1, the rotor 300, the stator 400, the shaft 500, the busbar 600, the sensor portion 700, and the like may be arranged. Here, the shaft 500 is rotatably disposed in the accommodation space. Hence, the motor 1 may further include bearings 10 disposed above and below the shaft 500.

The housing 100 may be formed to have a cylindrical shape. Also, the housing 100 may accommodate the stator 400, the rotor 300, and the like therein. Here, a shape or a material of the housing 100 may be variously modified. For example, the housing 100 may be formed of a metal material capable of withstanding high temperatures well.

The cover 200 may be disposed on an opening surface of the housing 100, that is, above the housing 100 to cover the opening of the housing 100.

The rotor 300 may be disposed inside the stator 400, and the shaft 500 may be coupled to a central part of the rotor 300. Here, the rotor 300 may be rotatably disposed inside the stator 400. Here, the inside may mean a direction toward a center C, and the outside may mean a direction opposite the inside.

FIG. 2 is a perspective view illustrating the rotor of the motor according to embodiments, FIG. 3 is an exploded perspective view illustrating the rotor of the motor according to embodiments, FIG. 4 is a plan view illustrating the rotor of the motor according to embodiments, FIG. 5 is a side view illustrating the rotor of the motor according to embodiments, and FIG. 6 is a cross-sectional view illustrating the rotor of the motor according to embodiments. Here, FIG. 6 is a cross-sectional view taken along line A-A of FIG. 5.

Referring to FIGS. 2 to 5, the rotor 300 includes a rotor portion 310, a first can 320 disposed above the rotor portion 310, and a second can 330 disposed below the rotor portion 310. Here, a part of a rotor core 311 may be disposed in the first can 320, and another part of the rotor core 311 may be disposed in the second can 330.

Here, the first can 320 and the second can 330 may be formed to have the same shape. Accordingly, since the first can 320 and the second can 330 may be used in common, manufacturing costs may be minimized.

However, when the first can 320 and the second can 330 are disposed on the rotor portion 310, since arrangement positions of protrusions formed on the first can 320 and the second can 330 are different, the first can 320 and the second can 330 have a difference therebetween.

FIG. 7 is a plan view illustrating the rotor portion disposed in the rotor of the motor according to embodiments.

Referring to FIG. 7, the rotor portion 310 includes the rotor core 311 and a plurality of magnets 313 arranged to be spaced at preset intervals on an outer circumferential surface of the rotor core 311. That is, the plurality of magnets 313 may be arranged to be spaced apart in a circumferential direction due to a plurality of separation spaces S. Here, the magnets 313 may be referred to as rotor magnets or drive magnets.

As shown in FIG. 7, the separation space S may be formed between the magnets 313.

The rotor core 311 may be implemented as a shape in which a plurality of plates having a circular thin steel plate shape are stacked or as a one cylinder shape. A hole to which the shaft 500 is coupled may be formed at a center C of the rotor core 311.

The rotor core 311 may be formed to have a cylindrical shape.

The rotor core 311 may further include guides 312 which extend and protrude outward from an outer circumferential surface 311a. The guides 312 may be integrally formed with the rotor core 311. Here, the guides 312 may be referred to as protrusions and correspond to guides 1211 shown in FIG. 11.

The guides 312 guide arrangement of the magnets 313. Accordingly, each of the magnets 313 may be disposed between the guides 312. Here, on the basis of the outer circumferential surface 311a of the rotor core 311, a protruding length L of the guides 312 is smaller than a thickness T of the magnets 313. Accordingly, the separation space S may be formed between the magnets 313 and be disposed outside the guide 312.

Here, the separation space S is formed by at least two magnets 313 and one surface of the guide 312 as an example but is not limited thereto. For example, when the guides 312 are eliminated, the separation space S may be formed by at least two magnets 313 and the outer circumferential surface 311a of the rotor core 311.

When the guides 312 are formed on the rotor core 311, since a region to which an adhesive member is applicable increases, a fixing force of the magnets 313 may be increased.

However, when the guides 312 are formed on the rotor core 311, a magnetic flux leakage may occur due to the guides 312. Accordingly, performance of the motor 1 is degraded. Therefore, the motor 1 may use the rotor portion 310 from which the guides 312 are eliminated.

The magnets 313 may be arranged on the outer circumferential surface of the rotor core 311 to be spaced at preset intervals. Here, the magnets 313 may be attached to the outer circumferential surface of the rotor core 311 using the adhesive member such as glue. Here, ten magnets 313 are provided as an example but the number thereof is not limited thereto.

The first can 320 and the second can 330 may be formed to have a cup shape with a hole at a center and are disposed to cover an upper part and a lower part of the rotor portion 310, respectively. Here, the term "can" may be designated as "cap." Accordingly, the first can 320 may be referred to as a first cap and the second can 330 may be referred to as a second cap.

The first can 320 and the second can 330 may protect the rotor portion 310 from an external shock or physical and chemical stimuli and prevent foreign substances from soiling the rotor portion 310.

Here, the first can 320 may include first protrusions 323 arranged in the separation spaces S each formed between the magnets 313. Here, the second can 330 may include second protrusions 333 arranged in the separation spaces S each formed between the magnets 313. Accordingly, the first protrusions 323 and the second protrusions 333 support the magnets 313 with the guides 312 to prevent the magnets 313 from moving in a rotational direction. Here, the first can 320 with the first protrusions 323 formed thereon and the second can 330 with the second protrusions 333 formed thereon may be fixed to the rotor core 311 using a fixing method such as welding.

The first protrusions 323 and the second protrusions 333 may be arranged to be rotationally symmetrical to each other on the basis of a center of the rotor 300.

Also, as shown in FIG. 3, the separation spaces S may be formed to extend from a top surface to a bottom surface of the rotor core 311. Also, the first protrusions 323 and the second protrusions 333 may be arranged in regions more adjacent to centers of the separation spaces S in an axial direction than both ends thereof.

Referring to FIGS. 2, 5, and 6, when viewed in the axial direction, the first protrusions 323 and the second protrusions 333 may be alternately arranged in the separation spaces S between the magnets 313 along the circumferential direction of the rotor core 311. That is, the first protrusions 323 and the second protrusions 333 may be arranged diagonally along the circumferential direction. Accordingly, the numbers of the first protrusions 323 and the second protrusions 333 may be minimized. Here, the axial direction is a longitudinal direction of the shaft 500. Here, the first protrusions 323 and the second protrusions 333 may be arranged at different heights on the basis of bottom surfaces of the magnets 313. Also, distances between the first protrusions 323 and the second protrusions 333 may be mutually uniform.

As shown in FIG. 6, one side of the magnet 313 may come into contact with the first protrusion 323 and the other side of the magnet 313 may come into contact with the second protrusion 333. Accordingly, the first protrusion 323 and the second protrusion 333 may support the one side and the other side of the magnet 313, respectively.

That is, the magnet 313 may be disposed between the first protrusion 323 and the second protrusion 333 such that movement of the magnet 313 in the rotational direction may be restricted.

FIG. 8 is a perspective view illustrating the first can disposed in the rotor of the motor according to embodiments, and FIG. 9 is a cross-sectional view illustrating the first can disposed in the rotor of the motor according to embodiments. Here, FIG. 9 is a cross-sectional view taken along line B-B' of FIG. 8.

Although FIGS. 8 and 9 illustrate the first can 320, since the second can 330 has the same shape as that of the first can 320, the second can 330 may be described with reference to FIGS. 8 and 9.

Referring to FIGS. 8 and 9, the first can 320 may include a ring-shaped first plate portion 321 disposed above the rotor portion 310, a first protruding portion 322 protruding from an outer circumferential surface of the first plate portion 321 in the axial direction, and the first protrusions 323 formed on the first protruding portion 322. Here, the first protrusions 323 may be disposed in at least two of the plurality of separation spaces S and arranged to be spaced apart.

The first plate portion 321 may be formed to have a ring shape in a plane view.

As shown in FIG. 4, the first plate portion 321 may be disposed to cover a part of the rotor core 311. For example, on the basis of the center C of the rotor 300, a distance from an inner circumferential surface of the first plate portion 321 is smaller than a distance from the outer circumferential surface of the rotor core 311.

Also, the first plate portion 321 may be fixed to the rotor core through spot welding at preset positions P. Accordingly, the first plate portion 321 prevents the magnets 313 from moving upward.

The first protruding portion 322 may be formed to protrude downward from the outer circumferential surface of the first plate portion. Here, the first protruding portion 322 may be integrally formed with the first plate portion 321. For example, the first protruding portion 322 may be formed by bending an edge of the first plate portion 321.

As shown in FIG. 8, the first protruding portion 322 may be formed to have a cylindrical shape.

The first protruding portion 322 may be disposed outside the magnets 313. Accordingly, the first protruding portion 322 prevents the magnets 313 from moving in the radial direction. That is, the first protruding portion 322 may support outer surfaces of the magnets 313 to correspond to a centrifugal force caused by rotation of the rotor 300.

A plurality of such first protrusions 323 may be formed on the first protruding portion 322. Also, the plurality of first protrusions 323 may be arranged to be spaced at certain intervals along a circumferential direction of the first protruding portion 322.

Here, the first protrusions 323 may be arranged to be rotationally symmetrical on the basis of the center C. Also, the first protrusions 323 may be formed to protrude inward from an inner circumferential surface 322a of the first protruding portion 322. As shown in FIG. 6, the first protrusions 323 may be formed to have a staple shape.

Here, the first protrusions 323 may be formed on an end of the first protruding portion 322. Here, the end of the first protruding portion 322 and an end of a second protruding portion 332 may come into contact with each other.

Referring to FIG. 6, the first protrusion 323 may be disposed in the separation space S between the magnets 313. Here, an inner surface 323a of the first protrusion 323 may be disposed to be spaced at a certain first distance d1 from an outer surface 312a of the guide 312. When the guides 312 are eliminated from the rotor 300, the inner surface 323a of the first protrusion 323 may be disposed to be spaced at the certain first distance d1 from the outer circumferential surface 311a of the rotor core 311.

The first protrusions 323 may be formed to protrude inward from the inner circumferential surface 322a of the first protruding portion 322. Accordingly, the first protrusion 323 may be disposed in the separation space S between the magnets 313.

Referring to FIG. 9, the first protrusion 323 may be arranged to be spaced at a certain second distance d2 from the first plate portion 321.

Also, the first protrusion 323 may be formed by pressurizing one region of an outer circumferential surface 322b of the first protruding portion 322 from the outside. As shown in FIG. 8, the one region of the outer circumferential surface 322b of the first protruding portion 322 may be bent inward. Accordingly, the first protrusion 323 may be referred to as a first bent portion.

When the outer circumferential surface 322b of the first protruding portion 322 is pressurized while the first protruding portion 322 is disposed outside the magnets 313, the magnets 313 may be damaged. Accordingly, the first protrusion 323 may be formed by pressurizing only one region of the outer circumferential surface 322b of the first protruding portion 322 so as to minimize a load applied to the magnets 313.

Also, the first protrusion 323 may be formed by pressurizing positions spaced at the certain second distance d2 from the first plate portion 321 so as to minimize the load applied to the magnets 313.

Meanwhile, the first protrusion 323 is formed by pressurizing one region of the outer circumferential surface 322b of the first protruding portion 322 such that a groove G may be concavely formed in the outer circumferential surface 322b of the first protruding portion 322. That is, the groove G may be formed in the outer circumferential surface 322b of the first protruding portion 322 at a position corresponding to the first protrusion 323. Here, the groove G in the outer circumferential surface 322b of the first protruding portion 322 may be designated as a first groove G to be distinguished from a second groove G formed in an outer circumferential surface 332b of the second protruding portion 332.

As shown in FIG. 2, a lower side of the first groove G may communicate with the separation space S formed between the magnets 313.

Also, the first protrusion 323 is formed by pressurizing one region of the outer circumferential surface 322b of the first protruding portion 322 such that a side surface 323b of the first protrusion 323 may be pressed against a side surface 313a of the magnet 313. Here, a certain load may be applied to the magnet 313.

Referring to FIGS. 8 and 9, the second can 330 may include a ring-shaped second plate portion 331 disposed below the rotor portion 310, a second protruding portion 332 protruding from an outer circumferential surface of the second plate portion 331 in the axial direction, and the second protrusions 333 formed on the second protruding portion 332. Here, the second protrusions 333 may be disposed in two other of the plurality of separation spaces S in which the first protrusions 323 are not disposed and may be disposed to be spaced apart.

The second plate portion 331 may be formed to have a ring shape in a plane view.

The second plate portion 331 may be disposed to cover a part of the rotor core 311. For example, on the basis of the center C of the rotor 300, a distance from an inner circumferential surface of the second plate portion 331 is smaller than a distance from the outer circumferential surface of the rotor core 311.

Also, the second plate portion 331 may be fixed to the rotor core through spot welding at preset positions P. Accordingly, the second plate portion 331 prevents the magnets 313 from moving downward.

The second protruding portion 332 may be formed to protrude upward from the outer circumferential surface of the second plate portion 331. Here, the second protruding portion 332 may be integrally formed with the second plate portion 331. For example, the second protruding portion 332 may be formed by bending an edge of the second plate portion 331.

Referring to FIG. 3, the second protruding portion 332 may be formed to have a cylindrical shape.

The second protruding portion 332 may be disposed outside the magnets 313. Accordingly, the second protruding portion 332 prevents the magnets 313 from moving in the radial direction. That is, the second protruding portion 332 may support outer surfaces of the magnets 313 to correspond to a centrifugal force caused by rotation of the rotor 300.

A plurality of such second protrusions 333 may be formed on the second protruding portion 332. Also, the plurality of second protrusions 333 may be arranged to be spaced at certain intervals along a circumferential direction of the second protruding portion 332.

Here, the second protrusions 333 may be arranged to be rotationally symmetrical on the basis of the center C. Also, the second protrusions 333 may be formed to protrude inward from an inner circumferential surface 332a of the second protruding portion 332. As shown in FIG. 6, the second protrusions 333 may be formed to have a staple shape.

Here, the second protrusions 333 may be formed on an edge of the second protruding portion 332.

Referring to FIG. 6, the second protrusion 333 may be disposed in the separation space S between the magnets 313. Here, an inner surface 333a of the second protrusion 333 may be disposed to be spaced at a certain first distance d1 from the outer surface 312a of the guide 312. When the guides 312 are eliminated from the rotor 300, the inner surface 333a of the second protrusion 333 may be disposed to be spaced at the certain first distance d1 from the outer circumferential surface 311a of the rotor core 311.

The second protrusions 333 may be formed to protrude inward from the inner circumferential surface 332a of the second protruding portion 332. Accordingly, the second protrusion 333 may be disposed in the separation space S between the magnets 313.

Referring to FIG. 9, the second protrusion 333 may be arranged to be spaced at a certain second distance d2 from the second plate portion 331.

Also, the second protrusion 333 may be formed by pressurizing one region of the outer circumferential surface 332b of the second protruding portion 332 from the outside. The one region of the outer circumferential surface 332b of the second protruding portion 332 may be bent inward. Accordingly, the second protrusion 333 may be referred to as a second bent portion.

When the outer circumferential surface 322b of the second protruding portion 332 is pressurized while the second protruding portion 332 is disposed outside the magnets 313, the magnets 313 may be damaged. Accordingly, the second protrusion 333 may be formed by pressurizing one region of the outer circumferential surface 332b of the second protruding portion 332 so as to minimize a load applied to the magnets 313.

Also, the second protrusion 333 may be formed by pressurizing positions spaced at the certain second distance d2 from the second plate portion 331 so as to minimize the load applied to the magnets 313.

Meanwhile, the second protrusion 333 is formed by pressurizing one region of the outer circumferential surface 332b of the second protruding portion 332 such that a groove G may be concavely formed in the outer circumferential surface 332b of the second protruding portion 332. Here, the groove G on the outer circumferential surface 332b of the second protruding portion 332 may be referred to as the second groove G.

An upper side of the second groove G may communicate with the separation space S formed between the magnets 313.

Also, the second protrusion 333 is formed by pressurizing one region of the outer circumferential surface 332b of the second protruding portion 332 such that a side surface 333b of the second protrusion 333 may be pressed against the side surface 313a of the magnet 313. Here, a certain load may be applied to the magnet 313.

Referring to FIG. 2, the end of the first protruding portion 322 of the first can 320 and an end of the second protruding portion 332 of the second can 330 may be disposed to come into contact with each other. Also, the ends of the first can 320 and the second can 330 which are in contact with each other may be fixed using an adhesive member or welding.

The stator 400 may be disposed inside the housing 100. Here, the stator 400 may be supported by an inner circumferential surface of the housing 100. Also, the stator 400 is disposed outside the rotor 300. That is, the rotor 300 may be disposed inside the stator 400.

Referring to FIG. 1, the stator 400 may include a stator core 410, an insulator 420 disposed on the stator core 410, and a coil 430 wound on the insulator 420.

The coil 430, which forms a rotating magnetic field, may be wound on the stator core 410. Here, the stator core 410 may be formed as one core or formed by coupling a plurality of divided cores.

The stator core 410 may include a plurality of plates which have a thin steel sheet shape and are stacked on one another but is not limited thereto. For example, the stator core 410 may be formed as a single component.

The stator core 410 may include a cylindrical yoke (not shown) and a plurality of teeth (not shown) protruding from the yoke in the radial direction. Also, the coil 430 may be wound on the teeth.

The insulator 420 insulates the stator core 410 from the coil 430. Accordingly, the insulator 420 may be disposed between the stator core 410 and the coil 430.

Accordingly, the coil 430 may be wound on the stator core 410 on which the insulator 420 is disposed.

The shaft 500 may be rotatably disposed inside the housing 100 by the bearings 10. Also, the shaft 500 may rotate in conjunction with the rotation of the rotor 300.

The busbar 600 may be disposed above the stator 400.

Also, the busbar 600 may be electrically connected to the coil 430 of the stator 400.

The busbar 600 may include a busbar body (not shown) and a plurality of terminals (not shown) arranged inside the busbar body. Here, the busbar body may be a molded material formed through injection molding. Also, each of the terminals may be electrically connected to the coil 430 of the stator 400.

The sensor portion 700 may sense a magnetic force of a sensing magnet installed to be rotationally coupled to the rotor and recognize a current position of the rotor 300 so as to sense rotation of the shaft 500.

The sensor portion 700 may include a sensing magnet assembly 710 and a printed circuit board (PCB) 720.

The sensing magnet assembly 710 is coupled to the shaft 500 to be coupled to the rotor 300 and detects a position of the rotor 300. Here, the sensing magnet assembly 710 may include a sensing magnet and a sensing plate.

The sensing magnet may include main magnets arranged in a circumferential direction to be adjacent to a hole, which forms an inner circumferential surface, and sub magnets formed on an edge. The main magnets may be arranged like drive magnets inserted into the rotor 300 of the motor. The sub magnets are further subdivided than the main magnets and include many poles. Accordingly, the sub magnets are able to more precisely divide and measure rotation angles and may include smoother driving of the motor.

The sensing plate may be formed of a metal material having a disc shape. The sensing magnet may be coupled to a top surface of the sensing plate. Also, the sensing plate may be coupled to the shaft 500. Here, a hole, through which the shaft 500 passes, is formed in the sensing plate.

A sensor, which senses a magnetic force of the sensing magnet, may be disposed on the PCB 720. Here, the sensor may be provided as a hall integrated circuit (IC). Also, the sensor may sense a change N pole and S pole of the sensing magnet and generate a sensing signal.

FIG. 10 is a view illustrating a motor according to embodiments.

Referring to FIG. 10, the motor according to other embodiments may include a shaft 1100, a rotor 1200, a stator 1300, and a housing 1400. Here, the motor according to embodiments shown in FIG. 10 may be referred to as a motor according to a second embodiment.

The shaft 1100 may be coupled to the rotor 1200. When the rotor 1200 rotates, the shaft 1100 rotates in conjunction therewith.

The rotor 1200 is coupled to the shaft 1100. The rotor 1200 is disposed inside the stator 1300.

The stator 1300 is disposed outside the rotor 1200. The stator 1300 may include a stator core 1310, an insulator 1320, and a coil 1330. The insulator 1320 is mounted on the stator core 1310. The coil 1330 is wound on the insulator 1320.

The rotor 1200 and the stator 1300 may be accommodated inside the housing 1400.

FIG. 11 is a plan view illustrating the rotor, FIG. 12 is a partially enlarged view of the rotor, and FIG. 13 is a view illustrating a first part and a second part of a rotor core.

Referring to FIGS. 11 and 12, the rotor 1200 may include a rotor core 1210 and magnets 1220.

The magnets 1220 may be disposed on an outer circumferential surface of the rotor core 1210. A plurality of such magnets 1220 may be present. The rotor core 1210 may include a plurality of guides 1211 formed to extend outward from the outer circumferential surface of the rotor core 1210. Here, the guides 1211 may be referred to as protrusions and may each be arranged in each of the separation spaces S. The plurality of guides 1211 may be arranged to be spaced along a circumferential direction on the basis of a center of the rotor core 1210. Accordingly, the magnet 1220 may be accommodated in an accommodation portion defined as a region between the plurality of guides 1211.

The rotor core 1210 may include a surface 1212 in which the magnet 1220 is disposed. The surface 1212 is disposed between the guides 1211 in the circumferential direction. An inner circumferential surface of the magnet 1220 comes into contact with the surface 1212.

The rotor core 1210 is a metal material. The magnet 1220 is attached to the surface 1212 of the rotor core 1210 by a magnetic force. A circumferential width of the surface 1212 is greater than a circumferential width of the magnet 1220. This is to secure an assembling property of the magnets 1220. On the basis of the circumferential direction, positions of the magnets 1220 have an effect on cogging torque. Accordingly, arranging the positions of the magnets 1220 in the circumferential direction is a significant factor for improving cogging torque. Since the circumferential width of the surface 1212 is greater than the circumferential width of the magnet 1220, it is necessary to push and align all the magnets 1220 in a clockwise or counterclockwise direction between the guides 1211.

The motor according to embodiments easily aligns all the magnets 1220 in the clockwise or counterclockwise direction using asymmetry of magnetic force between the magnets 1220 and the rotor core 1210.

Hereinafter, adjacent guides 1211 are referred to as a first guide 1211A and a second guide 1211B.

The rotor core 1210 may include a first part A and a second part B. The first part A and the second part B are divided on the basis of a center of the circumferential width between the first guide 1211A and the second guide 1211B.

A volume of the first part A is smaller than a volume of the second part B. A difference between the volume of the first part A and the volume of the second part B causes asymmetry of magnetic force between the magnets 1220. The asymmetry of the magnetic force means a difference between a magnetic force of one side and a magnetic force of the other side on the basis of the center of the circumferential width between the first guide 1211A and the second guide 1211B. A magnetic force at the first part A is relatively greater than a magnetic force at the second part B.

The circumferential width between the first guide 1211A and the second guide 1211B means a circumferential width between a first reference line L1 and a second reference line L2. The first reference line L1 is a virtual straight line which connects a boundary point P1 between the first guide 1211A and the rotor core 1210 to a center C of the rotor core 1210. The second reference line L2 is a virtual straight line which connects a boundary point P1 between the second guide 1211B and the rotor core 1210 to the center C of the rotor core 1210. When a virtual straight line, which connects a circumferential center of the first reference line L1 and the second reference line L2 to the center C of the rotor core 1210 in a circumferential direction is referred to as a third reference line L3, the first part A and the second part B are distinguished by the third reference line L3. Also, the surface 1212 may include a first surface 1212A and a second surface 1212B. The first surface 1212A and the second surface 1212B are distinguished on the basis of the third reference line L3.

A groove 1213 may be disposed in the first surface 1212A of the first part A. Here, the groove 1213 may be formed in the first surface 1212A of at least one of the accommodation portions. Also, the groove 1213 may be formed to extend from a top surface to a bottom surface of the rotor core 1210 and be disposed to be adjacent to the guide 1211.

The groove 1213 is formed to be recessed from the first surface 1212A. The groove 1213 may be disposed lengthwise along a longitudinal direction of the rotor core 1210. The groove 1213 may not be disposed in the second part B but may be disposed only in the first part A. Since the volume of the first part A and the volume of the second part B differ depending on whether the groove 1213 is present, asymmetry in magnetic force on the basis of the third reference line L3 is caused. Here, the groove 1213 of the motor according to the second embodiment may be formed in the rotor core 311 of the motor 1 according to the first embodiment.

An adhesive may be applied between the magnet 1220 and the surface 1212 of the rotor core 1210. The groove 1213 may be utilized as an escape space for a residual adhesive. In a process of mounting the magnet 1220 on the surface 1212, it is possible to reduce a downward flow of the residual adhesive toward an end of the rotor core 1210.

FIG. 14 is a view illustrating a modified example of the rotor core.

Referring to FIG. 14, as a modified example of the rotor core 1210, a first groove 1213A may be disposed in the first surface 1212A of the first part A, and a second groove 1213B may be disposed in the second surface 1212B of the second part B. Here, a size of the first groove 1213A may be greater than that of the second groove 1213B. For example, under a condition in which a radial thickness of the first groove 1213A is equal to a radial thickness of a second groove 1213B, a circumferential width W1 of the first groove 1213A may be greater than a circumferential width W2 of the second groove 1213B. Since the size of the first groove 1213A is greater than the size of the second groove 1213B, asymmetry in magnetic force on the basis of the third reference line L3 is caused.

FIG. 15 is a view illustrating another modified example of the rotor core.

Referring to FIG. 15, as another modified example of the rotor core 1210, a plurality of such first grooves 1213A may be disposed in the first surface 1212A of the first part A, and a smaller number of the second grooves 1213B than the number of the first grooves 1213A may be disposed in the second surface 1212B of the second part B. For example, two first grooves 1213A and one second groove 1213B may be present.

Here, a sum of the sizes of all the first grooves 1213A may be greater than a sum of the sizes of all the second grooves 1213B. For example, under a condition in which the radial thickness of the first groove 1213A is equal to the radial thickness of the second groove 1213B, a sum of circumferential widths W1a and W1b of all the first grooves 1213A may be greater than a sum of the circumferential width W2 of all the second grooves 1213B. Since the sum of the sizes of all the first grooves 1213A is greater than the sum of the sizes of all the second grooves 1213B, asymmetry in magnetic force on the basis of the third reference line L3 is caused.

FIG. 16 is a view illustrating movement of the magnets caused by asymmetry in magnetic force.

Referring to FIG. 16, a magnetic force in the second part B is relatively greater than a magnetic force in the first part A. Accordingly, in a circumferential direction, the magnet 1220 easily moves toward the second guide 1211B. When the magnet 1220 moves, a gap G1 occurs between the first guide 1211A and one side surface of the magnet 1220, and the second guide 1211B comes into contact with the other side surface of the magnet 1220. The above process occurs in all the magnets 1220 mounted on the rotor core 1210, and positions of all the magnets 1220 are aligned in the circumferential direction.

When the positions of all the magnets 1220 are aligned, an advantage of improving cogging torque is present.

FIG. 17 is a view illustrating cogging torques in a comparative example and an embodiment.

Referring to FIG. 17, the comparative example is a motor without a groove in an outer circumferential surface of a rotor core to which magnets are attached in which magnetic forces are formed to be symmetrical on the basis of a center of a circumferential width of a surface of the rotor core to which magnets are attached. The embodiment is a motor in which the groove 1213 is formed in the first part A and is not formed in the second part B.

In the case of the comparative example, average cogging torque is 37 mNm. In the case of the embodiment, average cogging torque is 22 mNm. The embodiment provides an effect of improving cogging torque 40% more than the comparative example.

In the case of the comparative example, dispersion cogging torque is 7.8 mNm. In the case of the embodiment, dispersion cogging torque is 5.1 mNm. The embodiment provides an effect of improving cogging torque 35% more than the comparative example.

Although the embodiments of the present invention have been described above, it may be understood by one of ordinary skill in the art that a variety of modifications and changes may be made without departing from the concept and scope of the present invention disclosed within the range of the following claims. Also, it should be noted that differences related to the modifications and changes are included within the scope of the present invention defined by the claims.

DESCRIPTION OF REFERENCE NUMERALS

1: motor, 100, 1400: housing, 200: cover, 300, 1200: rotor, 310: rotor portion, 311, 1210: rotor core, 312, 1211: guide, 313, 1220: magnet, 320: first can, 323: first protrusion, 330: second can, 333: second protrusion, 400, 1300: stator, 410: stator core, 430: coil, 500, 1100: shaft, 600: busbar, 700: sensor portion

The invention claimed is:

1. A motor comprising:
a shaft;
a rotor coupled to the shaft and including:
    a rotor core including a plurality of magnets and a plurality of separation spaces, each separation space being located between adjacent magnets among the plurality of magnets;
    a first can overlapping a first end of the rotor core and a first end of each of the plurality of magnets; and
    a second can overlapping a second end of the rotor core and a second end of each of the plurality of magnets, the first end of the rotor core being opposite to the second end of the rotor core, and the first end of each of the plurality of magnets being opposite to the second end of each of the plurality of magnets; and
a stator disposed outside the rotor,
wherein the plurality of magnets are spaced apart in a circumferential direction of the rotor core,
wherein the first can comprises a first plate portion, a first protruding portion formed by bending an edge of the first plate portion, and a plurality of first protrusions disposed in at least two different separation spaces of the plurality of separation spaces and spaced apart,
wherein the second can comprises a second plate portion, a second protruding portion formed by bending an edge of the second plate portion, and a plurality of second protrusions disposed in at least two different separation spaces of the plurality of separation spaces and spaced apart, and
wherein the first protrusions and the second protrusions are arranged diagonally.

2. The motor of claim 1, wherein the first protrusions and the second protrusions are arranged at different heights on the basis of bottom surfaces of the plurality of magnets.

3. The motor of claim 2, wherein the first protrusions are formed on an end of the first protruding portion, and
wherein the second protrusions are formed on an end of the second protruding portion.

4. The motor of claim 3, wherein the end of the first protruding portion comes into contact with the end of the second protruding portion.

5. The motor of claim 1, wherein the first protrusions are formed to protrude from an inner circumferential surface of the first protruding portion, and
wherein grooves are formed on an outer circumferential surface of the first protruding portion at positions corresponding to the first protrusions.

6. The motor of claim 1, wherein distances between the first protrusions and the second protrusions are uniform.

7. The motor of claim 1, wherein the separation space is formed to extend from a top surface to a bottom surface of the rotor core, and
wherein the first protrusion and the second protrusion are arranged in a region more adjacent to a center than both ends of the separation space.

8. The motor of claim 1, wherein the rotor core comprises a plurality of accommodation portions which accommodate the plurality of magnets, and
wherein at least one of the plurality of accommodation portions comprises a surface in which a groove is formed.

9. The motor of claim 8, wherein the rotor core comprises a plurality of guides formed to extend outward from an outer circumferential surface thereof,
wherein each of the plurality of guides is disposed in each of the plurality of separation spaces, and
wherein the accommodation portion is defined as a region between the plurality of guides.

10. The motor of claim 9, wherein the groove of the accommodation portion is formed to extend from a top surface of the rotor core to a bottom surface of the rotor core and disposed to be adjacent to the guide.

11. The motor of claim 9, wherein the plurality of first protrusions are spaced from the plurality of guides in a radial direction of the rotor.

12. The motor of claim 9, wherein the plurality of second protrusions are spaced from the plurality of guides in a radial direction of the rotor.

13. The motor of claim 1, wherein the plurality of first protrusions are spaced from the plurality of guides in a radial direction of the rotor, and
wherein the plurality of second protrusions are spaced from the plurality of guides in the radial direction of the rotor.

14. The motor of claim 1, wherein the plurality of first protrusions extend less than an entire height of the first can in an axial direction.

15. The motor of claim 1, wherein the plurality of second protrusions extend less than an entire height of the second can in an axial direction.

16. The motor of claim 1, wherein the plurality of first protrusions extend less than an entire thickness of the first can in an axial direction, and
wherein the plurality of second protrusions extend less than an entire thickness of the second can in the axial direction.

17. The motor of claim 1, wherein the plurality of first protrusions are spaced from the plurality of guides in a radial direction of the rotor,
wherein the plurality of first protrusions extend less than an entire thickness of the first can in an axial direction,
wherein the plurality of second protrusions are spaced from the plurality of guides in the radial direction of the rotor, and
wherein the plurality of second protrusions extend less than an entire thickness of the second can in the axial direction.

18. A motor comprising:
a shaft;
a rotor coupled to the shaft and including:
    a first can;
    a rotor core having a first end disposed in the first can and including a plurality of magnets and a plurality of separation spaces, each separation space being located between adjacent magnets among the plurality of magnets;
    a plurality of magnets coupled to the rotor core; and a second can, wherein a second end of the rotor core, separate from the first end of the rotor core, is disposed within the second can; and a stator disposed outside the rotor, wherein the plurality of magnets of the rotor are spaced apart in a circumferential direction of the rotor core, wherein the first can includes a plurality of first protrusions, each first protrusion being disposed in a respective separation space among the plurality of separation spaces, wherein the second can includes a plurality of second protrusions, each second protrusion being disposed in a respective separation space among the plurality of separation spaces separate from the separation spaces of the plurality of first protrusions, and wherein the plurality of first protrusions are spaced in a circumferential direction from the plurality of second protrusions.

19. The motor of claim 18, wherein the plurality of first protrusions are spaced from the plurality of guides in a radial direction of the rotor, and wherein the plurality of second protrusions are spaced from the plurality of guides in the radial direction of the rotor.

20. The motor of claim 19, wherein the plurality of first protrusions extend less than an entire thickness of the first core in an axial direction, and wherein the plurality of second protrusions extend less than an entire thickness of the second core in the axial direction.

* * * * *